(12) United States Patent
Kabel et al.

(10) Patent No.: US 10,916,029 B2
(45) Date of Patent: Feb. 9, 2021

(54) METHOD OF DETECTING A SPATIAL ORIENTATION OF A TRANSDUCER BY ONE OR MORE SPATIAL ORIENTATION FEATURES

(71) Applicant: Brüel & Kjær Sound & Vibration Measurement A/S, Nærum (DK)

(72) Inventors: Henning Kabel, Kgs. Lyngby (DK); Niels-Jørgen Jacobsen, Nivå (DK); Martin Qvist Olsen, Holte (DK)

(73) Assignee: Hottinger Brüel & Kjær A/S, Nærum (DK)

( * ) Notice: Subject to any disclaimer, the term of this patent is extended or adjusted under 35 U.S.C. 154(b) by 74 days.

(21) Appl. No.: 15/553,404

(22) PCT Filed: Feb. 24, 2016

(86) PCT No.: PCT/EP2016/053871
§ 371 (c)(1),
(2) Date: Aug. 24, 2017

(87) PCT Pub. No.: WO2016/135198
PCT Pub. Date: Sep. 1, 2016

(65) Prior Publication Data
US 2018/0075619 A1    Mar. 15, 2018

(30) Foreign Application Priority Data
Feb. 26, 2015  (EP) .................................... 15156792

(51) Int. Cl.
*G06T 7/70*    (2017.01)
*G01V 15/00*   (2006.01)
(Continued)

(52) U.S. Cl.
CPC ................ *G06T 7/70* (2017.01); *G01V 15/00* (2013.01); *G06K 7/1417* (2013.01); *G01V 3/081* (2013.01); *G01V 8/18* (2013.01)

(58) Field of Classification Search
None
See application file for complete search history.

(56) References Cited

U.S. PATENT DOCUMENTS

2008/0246614 A1* 10/2008 Paananen ......... G06K 19/07749
340/572.7
2009/0299176 A1   12/2009 Gleich
(Continued)

FOREIGN PATENT DOCUMENTS

CN    101087558 A    12/2007
CN    104303129 A    1/2015
(Continued)

OTHER PUBLICATIONS

International Search Report corresponding to International Patent Application No. PCT/EP2016/053871, European Patent Office, dated May 11, 2016; (5 pages).
(Continued)

*Primary Examiner* — Vu Lu
*Assistant Examiner* — Tracy Mangialaschi
(74) *Attorney, Agent, or Firm* — Nixon Peabody LLP

(57) ABSTRACT

One aspect of the invention relates to a method of detecting a spatial orientation of a transducer by a handheld optical scanning device. The method comprises steps of providing a first spatial orientation feature on at least a first outer housing surface of the transducer and arranging a handheld optical scanning device in a sightline of the first spatial orientation feature at a selected spatial orientation relative to the first outer surface of the transducer housing. The method comprises further steps of identifying the first spatial orien-
(Continued)

tation feature, detecting a spatial orientation of the handheld scanning device in a predetermined coordinate reference system and determining a spatial orientation of the transducer in the predetermined coordinate reference system.

20 Claims, 4 Drawing Sheets

(51) Int. Cl.
*G06K 7/14* (2006.01)
*G01V 3/08* (2006.01)
*G01V 8/18* (2006.01)

(56) References Cited

U.S. PATENT DOCUMENTS

| | | | | |
|---|---|---|---|---|
| 2010/0017178 A1* | 1/2010 | Tsuk | ................. | G01B 11/24 |
| | | | | 703/6 |
| 2011/0172951 A1 | 7/2011 | Schlumbohm | | |
| 2011/0228112 A1 | 9/2011 | Kaheel | | |
| 2012/0027251 A1* | 2/2012 | Wu | ................. | G01C 15/02 |
| | | | | 382/103 |
| 2012/0065928 A1* | 3/2012 | Rotvold | ............ | G01B 11/002 |
| | | | | 702/150 |
| 2013/0081442 A1 | 4/2013 | Basir | | |
| 2013/0201219 A1 | 8/2013 | Zhao | | |
| 2013/0259304 A1* | 10/2013 | Aller | .............. | G06K 9/3216 |
| | | | | 382/103 |
| 2014/0045558 A1 | 2/2014 | Kim | | |
| 2014/0363048 A1 | 12/2014 | Vrcelj | | |
| 2015/0235359 A1* | 8/2015 | Higashitsutsumi | .. | A61B 5/0077 |
| | | | | 382/128 |

FOREIGN PATENT DOCUMENTS

| | | | |
|---|---|---|---|
| JP | H 07-225242 A | 8/1995 | |
| JP | 2008-261755 A | 10/2008 | |
| JP | 2011-227081 A | 11/2011 | |
| JP | 2012-221261 A | 11/2012 | |
| JP | 2014-219393 A | 11/2014 | |
| WO | WO 2008/119422 A1 | 10/2008 | |
| WO | WO 2014/045558 A1 | 3/2014 | |
| WO | WO-2014045558 A1 * | 3/2014 | ........... A61B 5/0077 |

OTHER PUBLICATIONS

International Written Opinion corresponding to International Patent Application No. PCT/EP2016/053871, European Patent Office, dated May 11, 2016; (6 pages).

Japanese Office Action in Japanese Patent Application No. JP 2017-544881, dated Feb. 4, 2020 (3 pages).

* cited by examiner

METHOD OF DETECTING A SPATIAL ORIENTATION OF A TRANSDUCER BY ONE OR MORE SPATIAL ORIENTATION FEATURES

One aspect of the invention relates to a method of detecting a spatial orientation of a transducer by a handheld optical scanning device. The method comprises steps of providing a first spatial orientation feature on at least a first outer housing surface of the transducer and arranging a handheld optical scanning device in a sightline of the first spatial orientation feature at a selected spatial orientation relative to the first outer surface of the transducer housing. The method comprises further steps of identifying the first spatial orientation feature, detecting a spatial orientation of the handheld scanning device in a predetermined coordinate reference system and determining a spatial orientation of the transducer in the predetermined coordinate reference system.

BACKGROUND OF THE INVENTION

The checking and verification of function, placement and spatial orientation of multiple transducers or sensors of large measurement set-ups remain a considerable challenge in numerous types of applications of sound and vibration measurement, for example automotive testing or wind-turbine monitoring or testing. As dimensions of the test objects grow, the number of measurement locations on the test object grows. This is typically followed by a corresponding growth in the number of transducers contained in the measurement set-up. Consequently, opportunities for mistakes or errors in the measurement set-up such as misplaced, interchanged or inoperative transducers may grow even faster. There have recently been advances in so-called "smart sensors" that comprise non-volatile semiconductor memory. The semiconductor memory is capable of electronically storing various type of useful transducer information such as serial number, calibration value, and location in a standardized format defined within the IEEE-P1451.4 standard. The latter format is now designated Transducer Electronic Data Sheet (TEDS). Each TEDS compliant transducer is capable of transmitting its stored transducer information to a remote measurement system or equipment via a standardized communication protocol. The remote measurement system may automatically load the transducer information directly into a set-up description or file of the measurement system. This feature may therefore reduce human errors associated with manually entering the transducer data into the measurement system.

However, the checking and verification of the spatial orientation of each transducer in such measurement set-ups remain a significant challenge. The appropriate spatial orientation of the transducer is important in numerous types of sound and vibration measurements to ensure the intended component of e.g. sound pressure, sound intensity, acceleration, or any other physical quantity, is measured by the transducer or sensor.

SUMMARY OF THE INVENTION

The methodology of detecting a spatial orientation of a transducer in accordance with the present invention addresses and solves this problem by detecting a spatial orientation of the transducer by reading and recognizing at least a first spatial orientation feature of the transducer housing by an optical scanning device. The first spatial orientation feature indicates a first axis of sensitivity of the transducer to the physical quantity to be measured by the transducer such as sound pressure, force and acceleration. The optical scanning device may be integrated in a portable terminal such as a smartphone, mobile phone, tablet etc. to exploit pre-existing scanning hardware and software components of the portable terminal and thereby provide a low-cost and flexible hand-held device for the detection of the transducer orientation.

A first aspect of the invention relates to a method of detecting a spatial orientation of a transducer by a handheld optical scanning device; The methodology comprising steps of:

a) providing a first spatial orientation feature on at least a first outer housing surface of the transducer, wherein the first spatial orientation feature indicates a first axis of sensitivity of the transducer to a physical quantity such as acceleration, sound pressure, force etc. measured by the transducer, b) arranging a handheld optical scanning device in a sightline of the first spatial orientation feature at a selected spatial orientation relative to the first outer surface of the transducer housing, c) identifying the first spatial orientation feature by the handheld optical scanning device, d) detecting, by an orientation sensor of the handheld optical scanning device, a spatial orientation of the handheld scanning device in a predetermined coordinate reference system in connection with the identification of the first spatial orientation feature, e) determining a spatial orientation of the transducer in the predetermined coordinate reference system based on the first spatial orientation feature and the detected spatial orientation of the optical scanning device.

The handheld or portable optical scanning device may integrated with, or form part of, a portable terminal such as a smartphone, mobile phone, tablet or similar handheld software driven computing devices to exploit pre-existing camera hardware, orientation sensors, optical sensors etc. of the portable terminal and thereby provide a low-cost and flexible handheld or portable scanning device for the detection of the spatial orientation of the transducer. Likewise, graphical user interface (GUI) features, memory storage capacity and image processing hardware and software components of the portable terminal may be utilized in the execution or implementation of various steps of the present methodology such as one or more of the steps c), d) and e). One embodiment of the methodology may therefore comprise steps of:

recognizing or identifying the first spatial orientation feature by a first application program executed on a software programmable processor of the portable terminal, detecting the spatial orientation of the transducer by a second application program executed on the software programmable processor;

wherein each of the first and second application programs comprises a set of executable program instructions. The portable terminal preferably comprises a scanning device selected from a group of {smartphone, mobile phone, tablet}. The software programmable processor may comprise a microprocessor such as a Digital Signal Processor.

The transducer may comprise an acoustic transducer, a force or strain transducer or a single axis or triaxial accelerometer. The acoustic transducer may comprise a microphone or a loudspeaker. The first spatial orientation feature may comprise various physical characteristics of the first outer housing surface of the transducer. In some embodiments of the invention, the first spatial orientation feature may comprise a known and machine recognizable physical feature of the transducer such as a protrusion or indentation on the first outer housing surface of the transducer. In one exemplary embodiment, the first spatial orientation feature comprises a predetermined shape and orientation of a connector plug protruding from the transducer housing as discussed below in further detail with reference to the appended drawings. In alternative embodiments of the invention, the first spatial orientation feature comprises a first orientation tag comprising a first machine readable code indicating the first axis of sensitivity of the transducer. The machine readable code preferably comprises one or more symbols such as a bar code, a QR code or Data Matrix code, a letter, a number, an arrow or any combination of these symbols. The first machine readable code may comprise additional transducer information or data such as a serial number, a batch number, a type indicator or number, calibration data etc. The presence of the additional transducer information enables the handheld scanning device to record numerous types of useful information about the individual transducer or transducers of a particular sound and vibration measurement set-up in addition to the detection of the spatial orientation of the individual transducer or transducers in the predetermined coordinate reference system. The spatial orientation of the transducer and the additional transducer information may be transmitted to a remote measurement system by the handheld scanning device via a wireless data communication interface as discussed in further detail below.

In some embodiments of the invention, the first orientation tag comprises a second machine readable code indicating a second axis of sensitivity of the transducer wherein the second axis of sensitivity is extending substantially orthogonal to the first axis of sensitivity of the transducer; and optionally a third machine readable code indicating a third axis of sensitivity of the transducer extending substantially orthogonal to each of the first and second axes of sensitivity of the transducer. According to a preferred embodiment of the methodology, the handheld scanning device comprises a camera configured for recording an image of the first spatial orientation feature. A suitably configured program routine or application program executed on the handheld scanning device recognizes the first orientation tag on the first outer housing surface and may recognize and decode any machine readable code or codes of the first orientation tag. The first and second machine readable codes of the first orientation tag may for example comprise the previously discussed Data Matrix code or pattern which forms a rotationally asymmetric pattern in a plane of the first outer housing surface. Since a general shape or pattern of the Data Matrix code or pattern may be known a priori to the handheld optical scanning device, a suitable compensation program or routine of the scanning device may be configured to analyze a shape of the Data Matrix code on a captured picture or image of the first orientation tag. The position of a certain unique element of the Data Matrix code in the captured image relative to the known position of the same unique element in the first orientation tag may be determined such that the rotation of the transducer in a particular 2-dimensional plane of the transducer housing surface can be computed. Hence, the orientation of the transducer in at least two orthogonal directions of sensitivity can be determined in an advantageous manner based on the identification of a single orientation tag.

Despite the ability to determine at least two orthogonal directions of sensitivity of the transducer from a single orientation tag in some embodiments of the invention, the transducer may comprise a second spatial orientation feature on a second outer housing surface. The execution of the latter methodology may comprise:

providing a second spatial orientation feature on a second outer housing surface of the transducer wherein the second spatial orientation feature indicates a second axis of sensitivity of the transducer to the measured physical quantity;

wherein the second outer housing surface is substantially orthogonal to the first outer housing surface of the transducer. The presence of the second spatial orientation feature may provide a certain duplication of orientation information in embodiments where the first orientation tag indicates several axes of sensitivity.

This apparent duplication of orientation information on the outer housing surfaces of the transducer may nevertheless be very useful because it is generally not known in advance which particular outer housing surface or surfaces that will be visible for scanning/image capture by the handheld scanning device once the transducer is mounted on a test structure or placed in an array configuration. Hence, the provision of two or more orientation tags on respective outer housing surfaces of the transducer with redundant orientation information makes the test operator's scanning task faster and more predictable.

Providing the first orientation tag on at least the first outer housing surface according to step a) above may be carried out in different ways in different embodiments of the present methodology. The first orientation tag may be attached or bonded to the first outer housing surface of the transducer during fabrication of the transducer. In an alternative embodiment, the first spatial orientation tag may be attached or bonded to the first outer housing surface after fabrication of the transducer for example by the user or customer of the transducer. The user or customer may for example attach or bond the first spatial orientation tag to the first outer housing surface in connection with mounting the transducer to the test object. The first orientation tag, and any further orientation tags provided on the transducer housing surfaces, may comprise a separate sticker or label such as a flat piece of suitable material such as a paper, metal or plastic sheet with an outwardly facing surface carrying the first, and possibly second, machine readable marker or code. The first orientation tag may be attached to the first outer housing surface for example by gluing using an adhesive agent with good binding properties on the housing surface material. The adhesive agent is preferably sufficiently strong to bind the orientation tag or tags to the relevant housing surface or surfaces for at least the duration of the test to be carried out. This may not be a trivial task for certain types of test. Many vibrational tests involve intense exposure to adverse environmental conditions such as heat, vibrations, humidity etc.

Instead of using separate stickers or labels for the orientation tags, the appropriate machine readable code or codes of the tag or tags may be engraved or embedded in the outer housing surface or surfaces of the transducer to create a substantially permanent marking of the transducer. This is preferably carried out during fabrication of the transducer. The appropriate machine readable code or codes may be fabricated by printing or stamping or applying any other suitable impression making technique directly to the outer housing surface or surfaces of the transducer.

One advantageous embodiment of the methodology comprises:

f) transmitting, by the handheld optical scanning device, orientation data describing the determined orientation of the transducer in the predetermined coordinate reference system to a remote measurement system via a wireless or wired data communication link. The remote measurement system is coupled to an output of the transducer for receipt of a transducer signal representing a component of the measured physical quantity. The remote measurement system may comprise multiple measurement channels coupled to multiple transducers supplying respective transducer output signals to the measurement channels as discussed below in connection with a third aspect of the invention.

A second aspect of the invention relates to a transducer comprising:
a transducer element mounted in a transducer housing which comprises least a first outer housing surface,
a transducer output coupled to the transducer element for supplying a transducer signal representing a component of the measured physical quantity,
a first orientation tag attached to the first outer housing surface, wherein the first orientation tag comprises a first machine readable code indicating a first axis of sensitivity of the transducer element to a physical quantity such as acceleration, sound pressure, force etc. The respective properties of the first orientation tag and the first machine readable code have been discussed in detail above and the same applies to the different methods of fabricating and attaching the first orientation tag to the transducer housing. The transducer may include further orientation tags attached to other outer housing surfaces of the transducer, for example a second housing surface arranged substantially orthogonal to the first housing surface, for the reasons discussed above. In some embodiments of the transducer, the first orientation tag may comprise a second machine readable code indicating a second axis of sensitivity of the transducer extending substantially orthogonal to the first axis of sensitivity of the transducer; and optionally:
a third machine readable code indicating a third axis of sensitivity of the transducer extending substantially orthogonal to each of the first and second axes of sensitivity of the transducer. The transducer element(s) of the transducer may comprise a single-axis accelerometer, a biaxial or a tri-axial accelerometer or a microphone element. The transducer may comprise a connector providing a transducer signal output representing a component of the measured physical quantity. The connector is connectable to a remote measurement system for example via an electrical cable or optical cable. The transducer signal output may for example represent a measured component of acceleration, force or strain acting on the transducer along the first axis of sensitivity of the transducer. If the transducer is an actuator, e.g. a loudspeaker or ultrasonic sound emitter, the connector may be configured for receipt of an input signal or excitation signal of the actuator. The actuator may comprise a displaceable diaphragm.

A third aspect of the invention relates to a method of manufacturing a transducer comprising steps of:
manufacturing a transducer housing comprising a first outer housing surface,
attaching a transducer element to one or more interior surfaces of the transducer housing where the transducer element is sensitive to a physical quantity such as acceleration, sound pressure, force etc.,
connecting at least one electrical output of the transducer element to a terminal or pin of an externally accessible connector of the transducer for supplying at least one transducer signal representing at least one component of the physical quantity; and at least one of steps:
i) attaching a first spatial orientation tag to the first outer housing surface of the transducer, wherein the first orientation tag comprises a first machine readable code indicating a first axis of sensitivity of the transducer element to the physical quantity:
ii) printing, engraving or stamping the first machine readable code on the first outer housing surface of the transducer.

A fourth aspect of the invention relates to a transducer measurement assembly comprising a plurality of transducers according to any of the above described embodiments thereof. The plurality of transducers being mounted at a plurality of predetermined measurement locations distributed across a test object. The transducer measurement assembly further comprises the above-discussed remote measurement system. The remote measurement system comprises at least:
a plurality of input channels coupled to the respective transducer output signals of the plurality of transducers via respective wireless or wired signal connections,
a wireless data communication interface configured for receipt of respective orientation data of the plurality of transducers from an optical scanning device via a wireless or wired data communication link.

The remote measurement system may comprise a display showing the respective spatial orientations of the plurality of transducers coupled to the plurality of signal input channels. The remote measurement system may be placed in the same room as the test object or test structure in which case both a wired transmission and a wireless transmission of the orientation data from the handheld scanning device to the remote measurement system may be practical. The test operator may for example proceed to execute the above described steps b), c), d) and e) of the present methodology for each transducer of the plurality of transducers mounted on the test object. The respective orientation data of all transducers may be collected and temporary stored in the memory of the handheld scanning device during this process and subsequently transferred to the remote measurement system in a single data transmission session via the wireless or wired data communication link.

The transducer measurement assembly may comprise a plurality of machine readable location markers attached to the test object adjacent to the respective measurement locations wherein each machine readable location marker indicates a specific position or location on the test object.

BRIEF DESCRIPTION OF THE DRAWINGS

Preferred embodiments of the invention are described in more detail below in connection with the appended drawings, in which.

DESCRIPTION OF PREFERRED EMBODIMENTS

Figure 1:
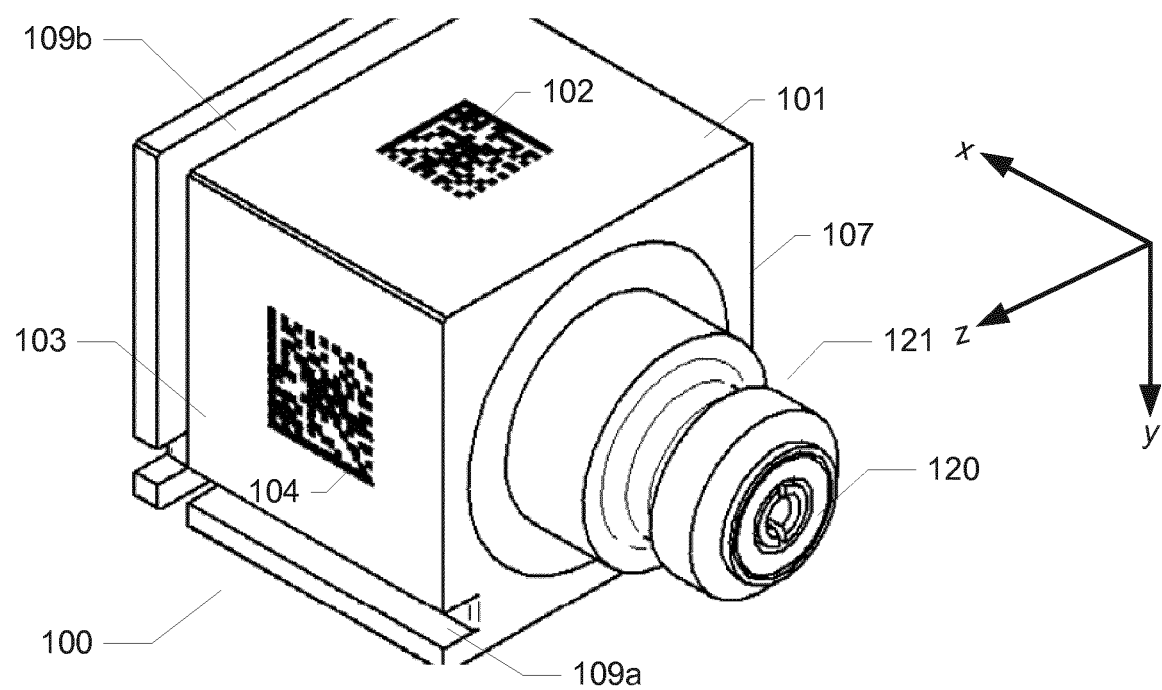
FIGS. 1A) and 1B) show schematic perspective illustrations of an exemplary transducer in form of a triaxial accelerometer comprising first, second and third spatial orientation tags attached to respective outer housing surfaces of the accelerometer in accordance with a first embodiment of the invention.
Figure 1:
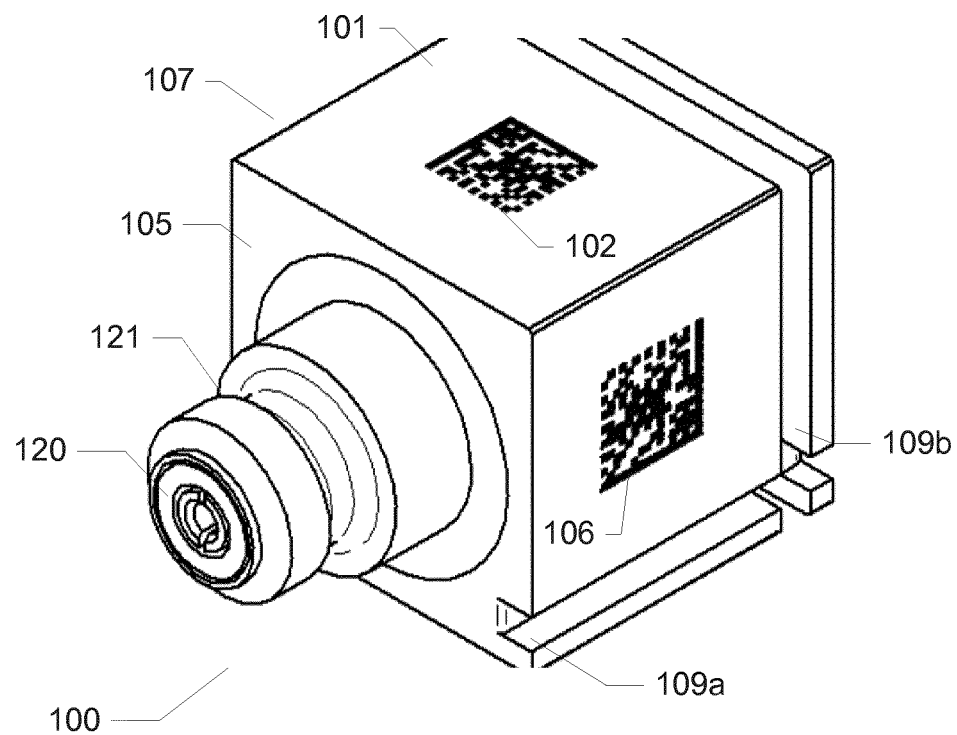

FIGS. 1A) and 1B) are schematic perspective illustrations of an exemplary triaxial accelerometer 100 suitable for use in methodologies of detecting the spatial orientation of a transducer by a handheld optical scanning device in accordance with the invention. The exemplary triaxial accelerometer 100 comprises first and second orientation tags 102, 104 attached to respective perpendicularly oriented first and second plane outer housing surfaces 101 and 103 of the triaxial accelerometer 100. The triaxial accelerometer 100 may comprise a third orientation tag attached to a third outer housing surface 105 oriented perpendicularly to both the first and second outer housing surfaces 101, 103. The first and second orientation tags 102, 104 serve as first and second spatial orientation features of the present triaxial accelerometer 100. The skilled person will understand that other embodiments of the accelerometer or other type of transducer may rely on certain known and machine recognizable physical features of the accelerometer or transducer housing such as a protrusion or indentation on the first and/or second outer housing surfaces for the recognition of the spatial orientation of the accelerometer or transducer. The first and second spatial orientation features may for example comprise the shape of the connector plug 121. The triaxial accelerometer 100 may for example comprise a triaxial piezoelectric accelerometer of types 4524, 4524-B or 4504 all manufactured by Brüel and Kjær Sound and Vibration Measurement, Nærum, Denmark. Other types of single-axis or multiple-axis accelerometers from numerous other manufacturers may of course in the alternative be used to implement the present invention. Depending on certain constructions details of the accelerometer, one or more piezoelectric transducer elements (not shown) may be mounted inside the transducer housing 107 responding to acceleration in a particular direction of three orthogonal spatial directions often designated x, y, z directions, by producing a voltage or current proportional to the acceleration in that particular direction. Various types of electronic signal conditioning circuitry and/or memory devices may likewise be mounted inside the transducer housing 107 on a suitable carrier such as low-noise preamplifiers, filters, A/D converters, power supplies etc. The electronic signal conditioning circuitry may be coupled to respective output terminals of the one more piezoelectric transducer elements to provide a low-impedance and possibly frequency shaped output signal of the accelerometer 100 for each x, y, z sensitivity direction. The accelerometer housing 107 may comprise a metallic composition or material such as titanium to protect the transducer element(s) against various harmful environmental pollutants e.g. humidity, mechanical shock, dust, light and heat etc. The metallic accelerometer housing 107 may also be useful for EMI shielding purposes. The accelerometer housing 107 comprises a number of optional slots 109a, 109b which support mounting clips for attachment or fitting of the accelerometer 100 to a number of different test objects. A lower substantially plane outer housing surface (hidden from view—arranged oppositely to the outer housing surface 101) of the accelerometer housing 107 is brought directly or indirectly (for example via a suitable adhesive agent or adhesive layer) in physical contact with the test structure. The lower substantially plane outer housing surface of the accelerometer housing 107 therefore acts a joining or coupling surface to the test structure.

The triaxial accelerometer 100 further comprises an electrical connector 120 which may comprise a 4-pin connector comprising a common ground terminal and three separate output signal terminals carrying the accelerometer x, y, z component output signals, respectively, representing the corresponding first, second and third orthogonal axes of sensitivity of the transducer element(s) of the triaxial accelerometer 100. The first, second orientation tags 102, 104 may for example indicate the x and y sensitivity directions, respectively, of the triaxial accelerometer 100. A fourth spatial orientation tag 106 is mounted on an opposing surface to the second outer housing surface 103, carrying the second orientation tag 104, with identical spatial orientation such that these tags 104, 106 may indicate the same axis of sensitivity of the triaxial accelerometer 100. This apparent duplication of the orientation tag indicating the y-axis direction of sensitivity may nevertheless be useful. This is because it is generally not known in advance of any particular test procedure which outer housing surface of the triaxial accelerometer 100 that will be visible for scanning/image capture once the triaxial accelerometer 100 is mounted on the test structure.

The x component output signal indicates the acceleration of the accelerometer 100 in the predefined x direction of the accelerometer protruding orthogonally through the first plane outer housing surface 101. The same applies for the y and z component output signals indicating acceleration along the y-axis and z-axis, respectively, to provide a true tri-axial acceleration measurement of vibration of the relevant test object or test structure. The latter structure may for example comprise an automotive body, an aircraft structure, a train structure, a wind turbine blade, a satellite structure etc. The electrical connector 120 may be used for coupling the x, y and z component output signals to a remote measurement system via a suitable cable, e.g. low-noise shielded cable. The skilled person will understand that a practical measurement set-up may include numerous, e.g. more than 20, or even more than 100, individual triaxial accelerometers 100 coupled to the remote measurement system via suitable electrical cabling. The remote measurement system may comprise a suitable accelerometer instrumentation system in combination with various types of data acquisition software executed on a personal computer or other computing hardware platform. The remote measurement system may comprise a display configured for graphically depicting status and identifiers of each of the measurement channels as well as identification and status information of each accelerometer for example by serial number. Each of the numerous triaxial accelerometers may be coupled to a particular measurement channel of the remote measurement system.

The metallic housing 107 of the triaxial accelerometer 100 has the previously discussed three substantially plane and mutually perpendicularly oriented outer housing surfaces 101, 103, 105. Two or three of these outer housing surfaces may have respective orientation tags firmly attached thereto preferably comprising at least three machine readable codes allowing each of the x, y and z axes of sensitivity of the triaxial accelerometer 100 to be uniquely identified in a predetermined coordinate/spatial reference system by the application of the present methodology of detecting a spatial orientation of a transducer as discussed below in further detail with reference to FIGS. 2, 3 and 4. The present methodology utilizes a suitably configured or programmed handheld optical scanning device (item 201 of FIG. 2) equipped with its own inertial or gyroscopic measurement system. The machine readable code of each of the orientation tags may indicate a single axis of sensitivity of the triaxial accelerometer 100, e.g. the axis protruding orthogonally through the housing surface carrying the orientation tag, or indicate two or three orthogonal axes of sensitivity of the triaxial accelerometer 100 depending on certain properties of the code pattern. In the present embodiment of the triaxial accelerometer 100, each of the first and second orientation tags 102, 104 comprises a Data Matrix or QR code for example in accordance with any of the ECC 000-ECC 200 standards. The skilled person will understand that numerous alternative types of machine readable codes may be utilized on each of the orientation tags 102, 104. In some embodiments, each of the machine readable codes may comprise a bar code, alpha numerical characters or a combination of the latter. The machine readable code of each of the orientation tags could for example simply depict the letter "X" or "Y" or "Z" possibly in conjunction with an arrow to indicate the axis direction to adhere to ordinary accelerometer terminology. The machine readable code of each of the orientation tags 102, 104 (and also tag 106) preferably comprises additional or supplemental transducer information such as a serial number, batch number, a type number, calibration data, an accelerometer type identifier etc. The machine readable code of one or both of the orientation tags 102, 104 may include both the first and second machine readable codes indicating the x axis of sensitivity and the y axis of sensitivity of the triaxial accelerometer 100. This is implemented by the rotationally asymmetric property, in a plane of the first outer housing surface 101, of the Data Matrix code including the first and second machine readable codes of the first orientation tag 102. The Data Matrix code of second orientation tag 104, attached to the second outer housing surface 103, may likewise include the second machine readable code and a third machine readable code. The third machine readable code may indicate the z axis of sensitivity of the triaxial accelerometer 100. The lack of rotational symmetry of the Data Matrix codes of orientation tags 102, 104 means that an angle of rotation of the triaxial accelerometer 100 in the plane of the first or second outer housing surfaces 101, 103 can be detected by the handheld optical scanning device as discussed in further detail below with reference to FIGS. 2, 3 and 4.

In some embodiments of the invention, each of the orientation tags 102, 104, 106 comprises a separate sticker for example relatively flat piece of material such as paper or plastic sheet with an outwardly facing side carrying the appropriate machine readable marker or code. The appropriate machine readable marker or code may be fabricated by printing or stamping, or using any other suitable impression making technique, to the housing surface. The orientation tag may be attached to the transducer housing surface in question for example by gluing using an adhesive agent with good binding properties on the housing surface material. The adhesive agent is preferably sufficiently strong to bind the orientation tag to the relevant housing surface for at least the duration of the vibrational test to be carried out. This may not be a trivial task since many vibrational tests involve intense exposure to adverse environmental conditions such as heat, vibrations, humidity etc. In the latter embodiment, the first and second orientation tags 102, 104 (and possibly the third orientation tag 106) may be retrofitted on the respective outer housing surfaces of an existing accelerometer for example in connection with preparation of the vibration test and test object. The first and second spatial orientation tags 102, 104 may be attached to the respective outer housing surfaces before the triaxial accelerometer 100 is mounted to the test object or after the triaxial accelerometer 100 is mounted to the test object, but before the vibration test is initialized. Alternatively, the above-mentioned type orientation tags may be attached to the respective outer housing surfaces of the accelerometer at its time of manufacture. In alternative embodiments of the invention, the orientation tags may be engraved or embedded in the respective outer housing surfaces of the accelerometer 100 to create a substantially permanent marking of the accelerometer housing 107. Each of the orientation tags may for example be fabricated or formed by well-known marking techniques such as stamping, engraving, moulding, etching, printing, laser marking etc. in connection with the fabrication of the accelerometer housing 107.

Figure 2:
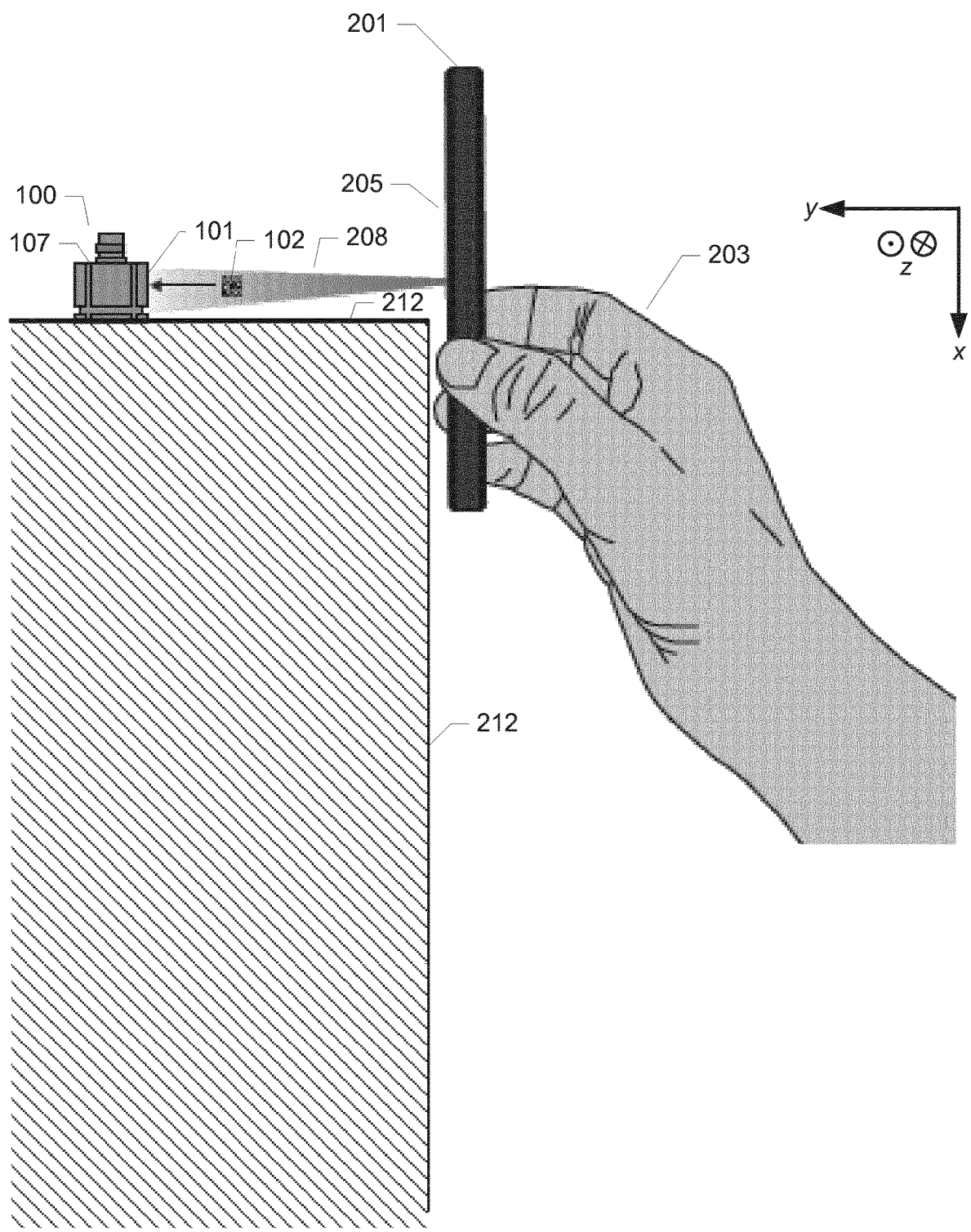
FIG. 2 is a schematic perspective illustration of the reading of one of the orientation tags mounted on the transducer housing, as depicted on FIG. 1, by an exemplary handheld optical scanning device in accordance with a first exemplary embodiment of the present methodology of detecting the spatial orientation of the triaxial accelerometer.

FIG. 2 is a schematic perspective illustration of the reading of a first spatial orientation feature, in form of the first data matrix encoded orientation tag 101, mounted on the first outer housing surface 101 of the accelerometer housing 107 (refer to FIG. 1) by an exemplary handheld optical scanning device 201 in accordance with a first embodiment of the methodology of detecting the spatial orientation of the triaxial accelerometer 100. The accelerometer housing 107 is firmly attached to the test object housing 212 at a desired position thereof via the previously discussed coupling surface of the the accelerometer housing 107. The exemplary optical scanning device 201 is embodied as a digital camera device of a smartphone in this first embodiment of the invention. The skilled person will understand that the smartphone provides numerous helpful functions supporting the execution of the present methodology, in particular a digital camera, image storage and manipulation applications and wireless communication link allowing various kind of information about the orientation tags 102, 104 to be uploaded to a remote computing system or platform for storage, displaying, processing etc.

The reading of the first data matrix encoded orientation tag 102 starts with the test operator grasps the smartphone 201 with his or her hand and aligns the substantially plane outer back surface 205 of the smartphone housing with the first, substantially plane, outer housing surface 101 of the triaxial accelerometer 100 such that these are aligned in the indicated z axis direction and also in the y axis direction extending into and out of the paper plane. This places the plane back surface 205 of the smartphone housing perpendicularly to the second, substantially plane, outer housing surface 103 of the triaxial accelerometer 100. Other relative spatial orientations between the outer housing surface 101 of the triaxial accelerometer 100 and the smartphone housing during reading of the first orientation tag 102 may be utilized in alternative embodiments of the methodology as explained below in connection with FIGS. 3 and 4. A sightline between the camera lens (not shown) of the smartphone 201 and the accelerometer 100 is schematically illustrated by optical ray path 208 which extends along the x axis of sensitivity. Based on the assumption that the sensitivity surface of the CCD chip (not shown) of the smartphone camera is aligned with the substantially plane outer back surface 205 the smartphone, it is evident that the image of the first orientation tag 102 is recorded or captured at a relative alignment of 0 degrees between the sensitivity surface of the CCD chip and the outer housing surface 101 of the triaxial accelerometer 100 such that the features and shape of the the first orientation tag 102 is projected largely (spatially) undistorted to the CCD chip. When the test operator notices that the desired spatial orientation between the smartphone housing and the housing 107 of the triaxial accelerometer 100 is reached with the camera focused onto the machine readable code(s) of the first tag 102, the test operator reads the orientation tag 102 by taking picture of the latter. In this way a digital image of the orientation tag 102 is stored in the memory of the smartphone. The orientation tag 102 with the data matrix code is for illustrative purposes shown within the optical ray path 208.

Substantially simultaneously with taking the picture of the orientation tag 102, a software programmable microprocessor (not shown) of the smartphone 201 polls or accesses a build-in orientation sensor or inertial navigation assembly of the smartphone to detect a corresponding spatial orientation of the smartphone 201. The skilled person will understand that this action, in some embodiments of the invention, may be accomplished in a relatively straight forward manner by a call to, and execution of, one or more already existing program routines or application programs of the operating system of the smartphone configured for reading 3-dimensional orientation data from the orientation sensor. The orientation sensor may comprise a MEMS based gyroscope. Hence, the build-in orientation sensor may read out the 3-dimensional orientation data which indicates the spatial orientation of the smartphone 201 in a predetermined coordinate reference system during reading of the first orientation tag 102. The microprocessor of the smartphone proceeds to detect the direction of sensitivity of the accelerometer 100 by decoding the data matrix encoded machine readable code(s) held on the first orientation tag 102. The skilled person will understand that the decoding of the data matrix encoded machine readable code(s) may be accomplished in a relatively straight forward manner by calling and executing already existing program routines of the operating system of the smartphone configured for decoding such data matrix codes from captured digital images. The program routine proceeds to determine the orientation of the triaxial accelerometer 100 in the predetermined coordinate reference system based on the axis of sensitivity indicated by the data matrix encoded machine readable code(s) of the first orientation tag 102 and the detected spatial orientation of the smartphone 201. Since the relative spatial orientation or alignment between the first plane outer housing surface 101 (holding the first orientation tag 102) of the triaxial accelerometer 100 and the sensitivity surface of the CCD chip is known for the reasons discussed above, it is straight forward to determine the spatial orientation of the triaxial accelerometer 100 in the predetermined coordinate reference system used by the orientation sensor of the smartphone 201. The previously discussed rotationally asymmetric property, in the plane of the first outer housing surface 101, of the data matrix encoded machine readable code(s) allows the program routine to detect the relative spatial orientation between the substantially plane outer back surface 205 of the smartphone housing and the first plane outer housing surface 101 of the triaxial accelerometer 100 along the y axis of sensitivity (in and out of the paper plane). This is accomplished by detecting the angular rotation in the z-y plane of the data matrix pattern or code(s) in picture of the first orientation tag.

On the other hand if the machine readable code(s) of the first orientation tag 102 lacks this rotationally asymmetric property, the above-outlined reading and recognition procedure of the first orientation tag 102 may be repeated by the operator in respect of the second orientation tag 104 to determine the spatial orientation of the the triaxial accelerometer 100 along the y axis of sensitivity.

The program routine executed on the software programmable microprocessor of the smartphone 201 is preferably additionally configured to read and decode the additional transducer information encoded in the data matrix encoded machine readable code(s) of the first orientation tag 102.

Consequently, the spatial orientation of the triaxial accelerometer 100 expressed in the predetermined coordinate reference system, and the additional transducer information, may be stored in a suitable memory location of the smartphone 201 after completion of the procedure. The 3-dimensional orientation data and the additional transducer information/data are thereafter transmitted to the remote measurement system via suitable wireless data communication link or channel. The data transmission initialization may be carried out automatically or by a manual action of the test operator. In the latter embodiment, the test operator may for example control the transmission process via a suitable graphical user interface (GUI) of a dedicated application program running on the smartphone 201. The data communication link or channel is preferably based on hardware and software components of an existing wireless communication interface of the smartphone and may comprise different types of standardized wireless data communication protocols such as GSM, GRPS, Wi-Fi, Bluetooth etc. In this manner, the 3-dimensional spatial orientation data and the additional transducer information/data of the triaxial accelerometer 100 is transmitted to the remote measurement system and stored therein at a suitable memory location. The remote measurement system associates or links the received 3-dimensional orientation data of the triaxial accelerometer 100 and its serial number with the particular measurement channels connected to respective ones of the x, y, z output signals of the accelerometer (through the 4 pin connector 120) representing the x, y, z components, respectively, of acceleration of the tri-axial accelerometer 100 on the test structure.

Finally, the above-mentioned methodology of detecting the spatial orientation of the tri-axial accelerometer 100 based on the spatial orientation tag 102 is preferably repeated for each of the residual accelerometers of the measurement set-up. Thereafter, each measurement channel of the measurement system is associated with transducer data indicating the 3-dimensional orientation and serial number of the accelerometer coupled to the measurement channel in question.

Figure 3:
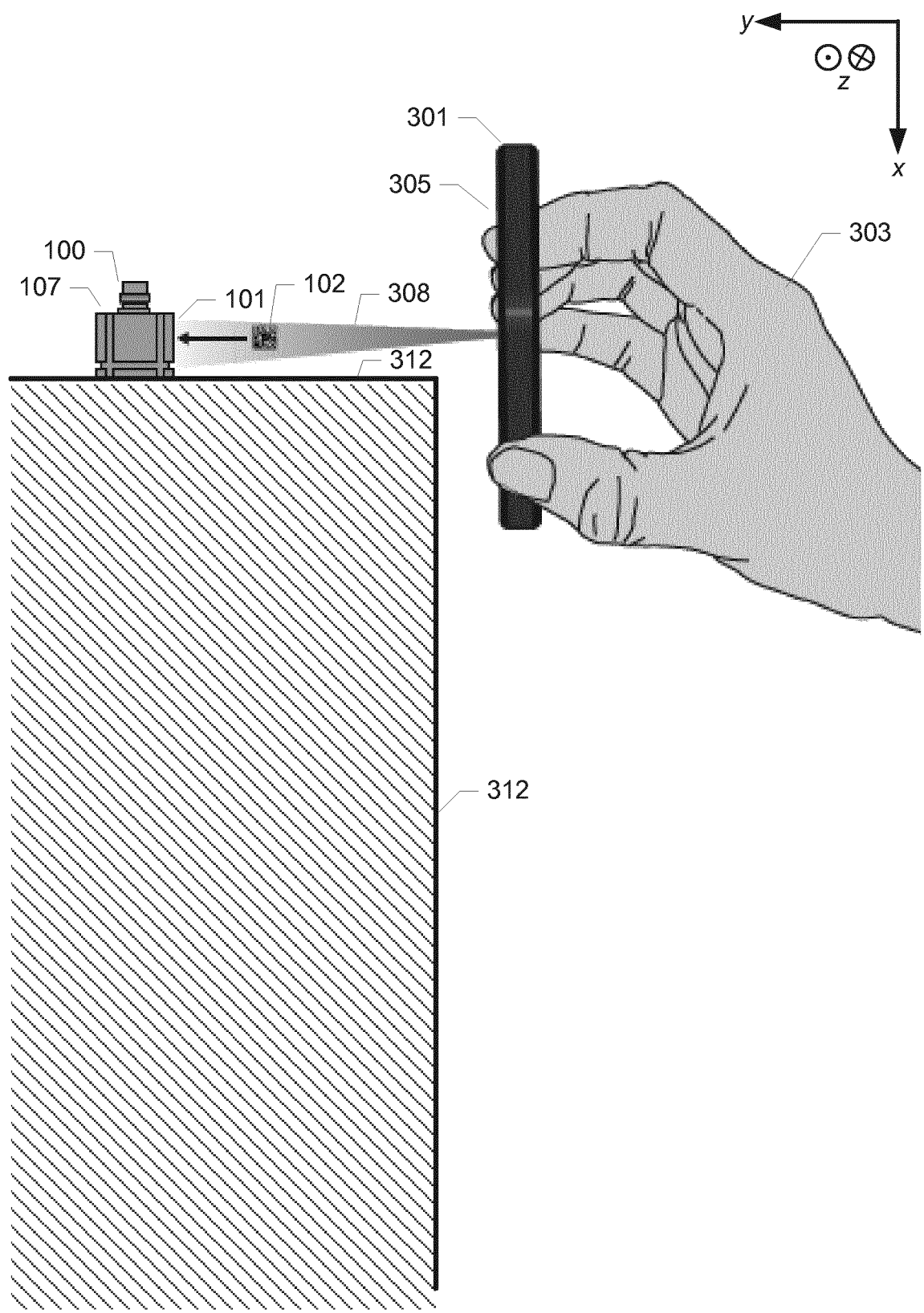
FIG. 3 is a schematic perspective illustration of the reading of one of the orientation tags mounted on the transducer housing, as depicted on FIG. 1, by an exemplary handheld optical scanning device in accordance with a second exemplary embodiment of the present methodology of detecting the spatial orientation of the triaxial accelerometer.

FIG. 3 is a schematic perspective illustration of the reading of the first data matrix encoded orientation tag 102, attached to the first outer housing surface 101 of the accelerometer housing 107 (refer to FIG. 1), by the previously discussed exemplary handheld optical scanning device 301 in accordance with a second embodiment of the methodology of detecting the spatial orientation of the triaxial accelerometer 100. Corresponding features of the first embodiment of the methodology discussed above in connection with FIG. 2 and the present embodiment have been provided with corresponding reference numerals to ease comparison. Generally, the present methodology repeats the above-mentioned steps in order to acquire the spatial orientation data of the triaxial accelerometer 100 and transmit these to the remote measurement system. However, in the present embodiment the test operator 303 has rotated the smartphone 301, and thereby the sensitivity surface of the CCD chip, relative to the first plane outer housing surface 101 of the tri-axial accelerometer 100 in the z-x plane at a certain a priori unknown rotation angle, for example about 45 degrees. The ability to read the machine readable code or codes of the first orientation tag 102 and determine the spatial orientation of the tri-axial accelerometer 100 without having to align the smartphone 301 and the first plane outer housing surface 101 of the accelerometer 100 in the z-x plane and/or in the z-y plane is an advantageous feature in many practical measurement situations. Physical restrictions imposed by the shape and dimensions of the test object surfaces 312 often make it impossible or time consuming to obtain proper alignment in the z-x plane and/or in the z-y plane. Consequently, relaxing these alignment requirements may significantly reduce the operator's time consumption. The lack of rotational symmetry of the data matrix code or codes of the first orientation tag 102 in combination with the a priori known general shape of the data matrix code allows a suitable compensation program or routine executed on the software programmable microprocessor of the smartphone 301 to determine the rotation of the machine readable code(s) on the captured picture or image. If the data matrix code for example comprises a characteristic feature or element at a known position of the code, the compensation program routine analyzes the amount of rotation of this characteristic feature or element in the captured image of the data matrix code to determine the rotation angle between the first outer housing surface 101 and the smartphone 301 in the z-x plane. Once, the rotation angle is determined, the compensation program may combine acquired 3-dimensional orientation data from the orientation sensor of the smartphone 301 with the determined rotation angle to determine the actual orientation of the triaxial accelerometer 100 in the predetermined coordinate reference system utilized by the smartphone 301.

Figure 4:
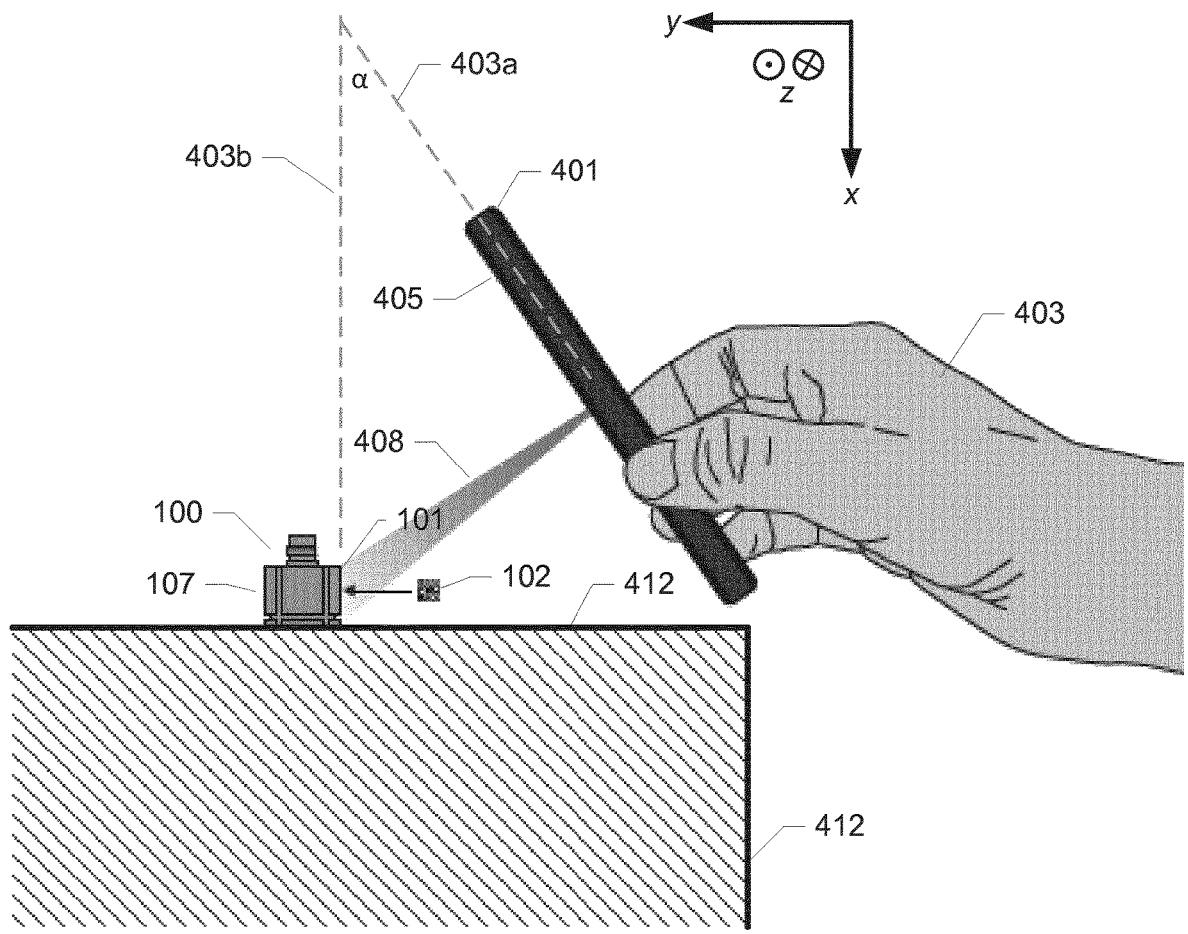
FIG. 4 is a schematic perspective illustration of the reading of a particular orientation tag mounted on the transducer housing, as depicted on FIG. 1, by an exemplary handheld optical scanning device in accordance with a third exemplary embodiment of the present methodology of detecting the spatial orientation of the triaxial accelerometer.

FIG. 4 is a schematic perspective illustration of the reading of the first data matrix encoded orientation tag 102, attached to the first outer housing surface 101 of the accelerometer housing 107 (refer to FIG. 1), by the previously discussed exemplary handheld optical scanning device 401 in accordance with a third embodiment of the methodology of detecting the spatial orientation of the triaxial accelerometer 100. Corresponding features of the first embodiment of the methodology discussed above in connection with FIG. 2 and the present embodiment have been provided with corresponding reference numerals to ease comparison. Generally, the present methodology repeats the above-mentioned steps in order to acquire the spatial orientation data of the triaxial accelerometer 100 and transmit these to the remote measurement system. However, in the present embodiment the test operator 403 is not required to align the sensitivity surface of the CCD chip of the smartphone 401 and the first plane outer housing surface 101 of the accelerometer 100 carrying the first orientation tag 102 along the z-axis to the 0 degree angle discussed above. As illustrated by the depicted optical ray path 408 and the alignment lines 403a, 403b, the test operator 403 has rotated the smartphone 401, and thereby the sensitivity surface of the CCD chip at a certain a priori unknown tilt angle α in the x-z plane. Hence, depending on the type of pattern used for the machine readable code(s) of the first orientation tag 102 these machine readable codes may be appear more or less spatially distorted in the recorded camera picture. However, since the general shape or pattern of the machine readable marker or code may be known a priori, the microprocessor may contain a suitable compensation program or routine that analyses the shape of the machine readable code(s) of the first orientation tag on the captured picture or image data. If the machine readable code(s) for example comprises a square element at a known position in the first orientation tag 102, the compensation program routine analyzes the amount of geometrical deformation of the square element in the captured picture to determine the tilt angle α. Once, the tilt angle is determined, the microprocessor may combine acquired 3-dimensional orientation data from the orientation sensor of the smartphone 401 with the determined tilt angle to determine the correct orientation of the first outer housing surface 101 in the predetermined coordinate reference system utilized by the smartphone.

According to another aspect of the present invention, the measurement set-up also comprises a plurality of machine readable location markers attached to the test object for example adjacent to the measurement location where the accelerometer is mounted. The measurement location marker may indicate at which position of the test object the measurement location is situated—for example by using descriptive words like "wing tip" or "trailing wing edge at base" or by numerical coordinate sets of predetermined a coordinate system spanning across the test object. Hence, the test operator may scan the measurement location marker using the optical scanning device of the smartphone in connection with, e.g. before or after, the above-mentioned reading and decoding process of each of the machine readable QR tags of the tri-axial accelerometers. In this manner, both the accelerometer location information and the accelerometer orientation data can be acquired in a single overall scanning procedure of the test object. The skilled person will appreciate that the location information may be transmitted to the remote measurement system together with the 3-dimensional orientation data and the additional transducer information/data of the accelerometer.

The invention claimed is:

1. A method of detecting a spatial orientation of each of a first and a second transducer by a handheld optical scanning device, the method comprising steps of:
   a) providing a first spatial orientation feature on at least a first outer housing surface of one of the first or the second transducer, wherein the first spatial orientation feature indicates a first axis of sensitivity of the one of first or the second transducer to a physical quantity measured by the one of first or the second transducer, wherein the first and the second transducer are mounted at respective predetermined measurement locations distributed across a test object,
   b) arranging the handheld optical scanning device in a sightline of the first spatial orientation feature at a selected spatial orientation relative to the first outer surface of the one of the first or the second transducer housing,
   c) identifying the first spatial orientation feature by the handheld optical scanning device,
   d) detecting, by an orientation sensor of the handheld optical scanning device, a spatial orientation of the handheld scanning device in a predetermined coordinate reference system in connection with the identification of the first spatial orientation feature, and
   e) determining a spatial orientation of the one of the first or the second transducer in the predetermined coordinate reference system based on the first spatial orientation feature and the detected spatial orientation of the handheld optical scanning device, and repeating steps a) to e) for the other of the first and the second transducer, where step b) for the first or the second transducer precedes step b) for the other of the first and the second transducer, and where the predetermined coordinate reference system of step d) is the same for the first and the second transducer.

2. A method according to claim 1, wherein the first spatial orientation feature comprises a protrusion or indentation on the first outer housing surface of the first or the second transducer, respectively.

3. A method according to claim 1, wherein the first spatial orientation feature comprises a first orientation tag comprising a first machine readable code indicating the first axis of sensitivity.

4. A method according to claim 3, wherein the first machine readable code comprises additional transducer information, the additional transducer information including a serial number or batch number, a type number, or calibration data.

5. A method according to claim 4, wherein the first machine readable code comprises one or more of: a bar code, a QR code, a letter, a number, or any combination thereof.

6. A method according to claim 4, wherein the first orientation tag comprises:
a second machine readable code indicating a second axis of sensitivity of the one of the first or the second transducer extending substantially orthogonal to the first axis of sensitivity.

7. A method according to claim 6, wherein the first and second machine readable codes of the first orientation tag are formed by a rotationally asymmetric pattern in a plane of the first outer housing surface.

8. A method according to claim 1, comprising a further step of:
providing a second spatial orientation feature on a second outer housing surface of the one of the first or the second transducer, wherein the second spatial orientation feature indicates a second axis of sensitivity of the one of the first or the second transducer to the measured physical quantity;
wherein the second outer housing surface is substantially orthogonal to the first outer housing surface.

9. A method according to claim 3, comprising:
attaching the first spatial orientation tag to the first outer housing surface of the one of the first or the second transducer during fabrication thereof under step a) of claim 1.

10. A method according to claim 3, comprising:
attaching the first spatial orientation tag on the first outer housing surface of the one of the first or the second transducer in connection with mounting the one of the first or the second transducer to the test object.

11. A method according to claim 1, wherein the handheld optical scanning device comprises a camera configured for recording an image of the first spatial orientation feature.

12. A method according to claim 1, comprising further step of:
f) transmitting, by the handheld optical scanning device, orientation data describing the determined orientation of the one of the first or the second transducer in the predetermined coordinate reference system to a remote measurement system via a wireless or wired data communication link, wherein the remote measurement system is coupled to an output of the one of the first or the second transducer for receipt of a transducer signal representing a component of the measured physical quantity.

13. A method according to claim 2, wherein the first spatial orientation feature comprises a first orientation tag comprising a first machine readable code indicating the first axis of sensitivity.

14. A method according to claim 5, wherein the first orientation tag comprises:
a second machine readable code indicating a second axis of sensitivity of the respective one of the first or the second transducer extending substantially orthogonal to the first axis of sensitivity.

15. A method according to claim 6, wherein the first orientation tag comprises a third machine readable code indicating a third axis of sensitivity of the respective first or the second transducer extending substantially orthogonal to each of the first and second axes of sensitivity of the respective first or the second transducer.

16. A method according to claim 5, wherein the first orientation tag comprises:
a second machine readable code indicating a second axis of sensitivity of the respective first or the second transducer extending substantially orthogonal to the first axis of sensitivity of the respective first or the second transducer; and
a third machine readable code indicating a third axis of sensitivity of the respective first or the second transducer extending substantially orthogonal to each of the first and second axes of sensitivity of the respective first or the second transducer.

17. A method according to claim 1, wherein the physical quantity is acceleration, sound pressure, force, or strain.

18. A system for detecting a spatial orientation of each of a first and a second transducer by a handheld optical scanning device, the system comprising:
the first transducer, comprising:
a first spatial orientation feature on at least a first outer housing surface of the first transducer, wherein the first spatial orientation feature indicates a first axis of sensitivity of the first transducer to a physical quantity measured by the first transducer;
the second transducer, comprising:
a second spatial orientation feature on at least a second outer housing surface of the second transducer, wherein the second spatial orientation feature indicates a second axis of sensitivity of the second transducer to a physical quantity measured by the second transducer; and
the handheld optical scanning device, comprising an orientation sensor, wherein
the first and the second transducer are configured to be mounted at respective predetermined measurement locations distributed across a test object of the system, and
the system is configured to:
c1) identify the first spatial orientation feature by the handheld optical scanning device in response to b1) arranging the handheld optical scanning device in a sightline of the first spatial orientation feature at a selected spatial orientation relative to the first outer surface of the first transducer housing;
d1) detect, by the orientation sensor of the handheld optical scanning device, a first spatial orientation of the handheld scanning device in a predetermined coordinate reference system in connection with the identification of the first spatial orientation feature;

e1) determine a first spatial orientation of the first transducer in the predetermined coordinate reference system based on the first spatial orientation feature and the detected first spatial orientation of the handheld optical scanning device;

c2) identify the second spatial orientation feature by the handheld optical scanning device in response to b2) arranging the handheld optical scanning device in a sightline of the second spatial orientation feature at a selected spatial orientation relative to the second outer surface of the second transducer housing;

d2) detect, by the orientation sensor of the handheld optical scanning device, a second spatial orientation of the handheld scanning device in the predetermined coordinate reference system in connection with the identification of the second spatial orientation feature; and e2) determine a second spatial orientation of the second transducer in the predetermined coordinate reference system based on the second spatial orientation feature and the detected second spatial orientation of the handheld optical scanning device.

19. The system according to claim 18, wherein
the first spatial orientation feature comprises a first orientation tag attached to the first outer housing surface, wherein the first orientation tag comprises a first machine readable code indicating the first axis of sensitivity; and
the second spatial orientation feature comprises a second orientation tag attached to the second outer housing surface, wherein the second orientation tag comprises a second machine readable code indicating the second axis of sensitivity.

20. The system according to claim 18, wherein the first spatial orientation feature comprises a protrusion or indentation on the first outer housing surface of the first transducer, or the second spatial orientation feature comprises a protrusion or indentation on the second outer housing surface of the second transducer.

* * * * *

UNITED STATES PATENT AND TRADEMARK OFFICE
CERTIFICATE OF CORRECTION

| | |
|---|---|
| PATENT NO. | : 10,916,029 B2 |
| APPLICATION NO. | : 15/553404 |
| DATED | : February 9, 2021 |
| INVENTOR(S) | : Kabel et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 194 days.

Signed and Sealed this
Tenth Day of January, 2023

Katherine Kelly Vidal
*Director of the United States Patent and Trademark Office*